United States Patent Office 3,329,846
Patented July 4, 1967

3,329,846
DYNAMO ELECTRIC MACHINE
Peter John Lawrenson, Leeds, England, assignor to National Research Development Corporation, London, England, a corporation of Great Britain
Filed Oct. 1, 1964, Ser. No. 400,868
Claims priority, application Great Britain, Oct. 4, 1963, 39,205/63
6 Claims. (Cl. 310—266)

This invention relates to dynamo electric machines of the reluctance type. Such machines have a stator winding arranged to provide a rotating or pulsating magnetic field and a rotor, the magnetic material of which is arranged anisotropically and which may or may not have an electrical winding.

It is an object of the invention to provide a machine in which the inertia is reduced as much as possible without reduction of the torque so that an improved torque/inertia ratio and transient performance is obtained.

According to the present invention a reluctance machine comprises a stator having an A.C. winding arranged to provide a rotating or pulsating magnetic field and a hollow cylindrical rotor member including magnetic material arranged to provide low reluctance paths for the magnetic field together with an electrical winding.

Preferably a separate core of magnetic material is provided within the space defined by the rotor member. In one form of construction the rotor member is supported at one end only and is open-ended at the other end, the core being fixed relative to the stator and extending from the open end of the rotor member into the space defined within it. In an alternative form of construction the separate core is mounted so as to be free to rotate within the rotor member.

The electrical winding can be a squirrel-cage winding or any other continuous electrical winding of known type.

Figure 1:
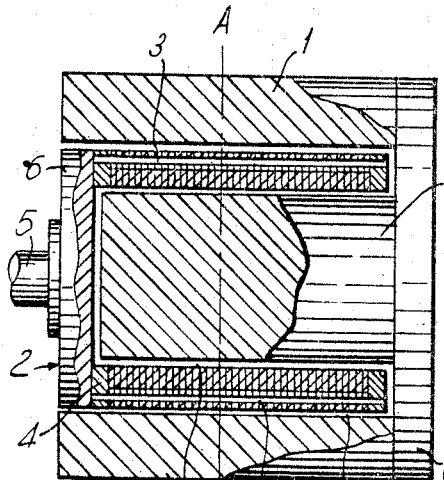
Figure 2:
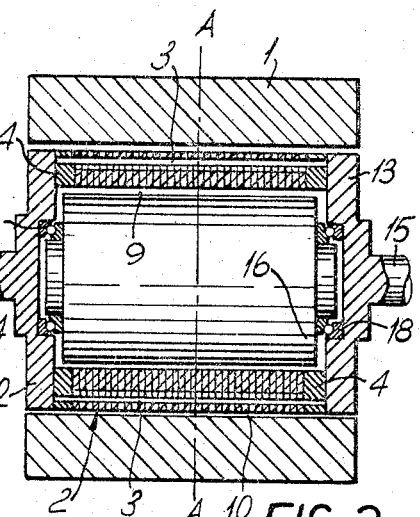
Figure 3:
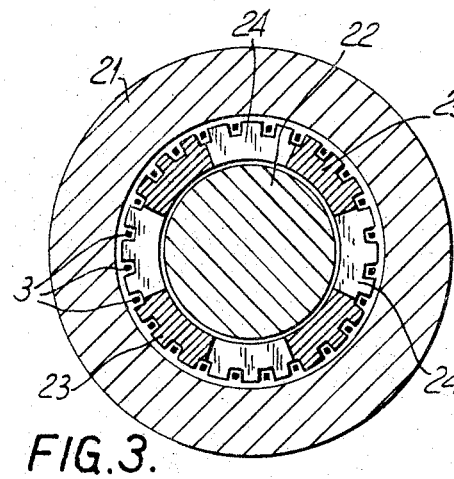
Figure 5:
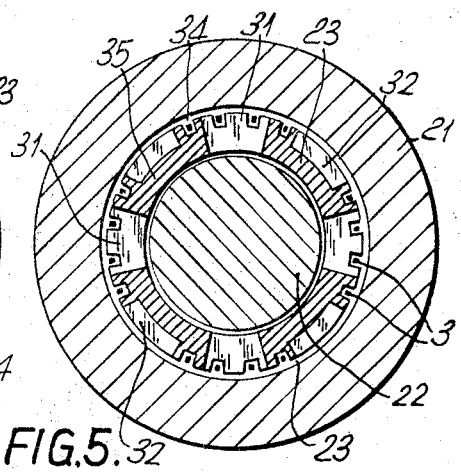
Figure 4:
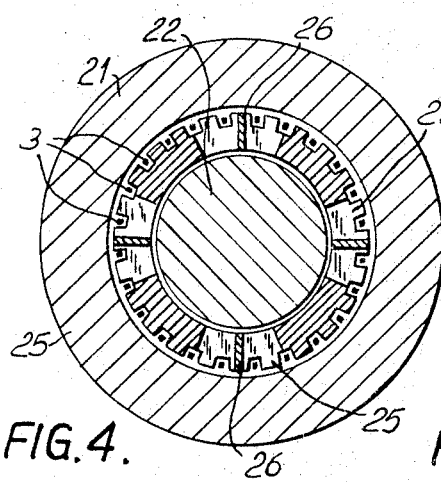
Figure 6:
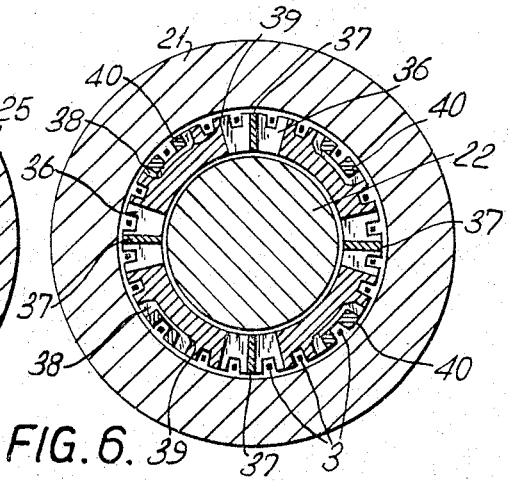

In order that the invention may be more fully understood, reference will now be made to the drawings accompanying this specification in which:

FIGURE 1 is a side view in simple diagrammatic form of a motor embodying the invention, FIGURE 2 is a side view of another embodiment of the invention, FIGURE 3 is a view along the line A—A of FIG. 1 or FIGURE 2 illustrating the invention, and FIGS. 4, 5 and 6 are views similar to FIGURE 3 but showing other constructions of a reluctance motor.

Referring now to FIGURE 1 there is shown in simple diagrammatic form a stator 1 which is provided with a conventional winding, not shown in detail, which may either be a polyphase winding arranged to provide a rotating magnetic field or else a single phase A.C. winding providing a pulsating magnetic field together with the usual auxiliary starting winding. The rotor member 2 is of hollow cylindrical shape and is constructed of magnetic material which may be solid or in the form of stacks of magnetic stampings. Rotor member 2 is also provided with a series of electrically conductive bars 3 lying in slots extending axially thereof around its periphery and connected together by end rings 4 to form a conventional squirrel-cage type winding. Rotor member 2 is attached at one end thereof only to a shaft 5 by means of an end plate 6.

The space defined within the hollow rotor member 2 is filled with a fixed inner core 7 of magnetic material secured to stator member 1 by means of a spider 8. A small air gap 9 is provided between core 7 and rotor 2 in addition to the conventional air gap 10 between stator 1 and rotor 2. Rotor member 2 is thus free to rotate between these two air gaps 9 and 10.

FIGURE 2 illustrates an alternative construction to that shown in FIGURE 1. In FIGURE 2 the stator and hollow rotor member 2 with squirrel-cage winding 3 and end rings 4 are of similar construction to FIGURE 1 but rotor member 2 is held by two end plates 12 and 13 at opposite ends thereof secured to two respective shaft 14 and 15, thus completely enclosing a hollow space within the rotor member. Within this hollow space there is provided an inner core 16 of magnetic material which is free to rotate in bearings 17 and 18 housed in the end plates 12 and 13. The operation of the arrangement illustrated in FIGURE 2 is similar to FIGURE 1 except that inner core 16 is free to rotate.

The hollow rotor member 2 illustrated in FIGURE 1 or FIGURE 2 is constructed on the reluctance principle. That is to say, it includes magnetic material arranged anisotropically so as to have, relative to the stator magnetic field, a direct axis position of low magnetic reluctance and a quadrature axis position of high magnetic reluctance. Various arrangements of magnetic material in the hollow rotor member 2 are illustrated in cross-sections of FIGS. 3, 4, 5 and 6 respectively. The portions of the hollow rotor member which are of magnetic material will normally be laminated and are so illustrated in these figures.

Referring now to FIGURE 3, a rotor of a 4-pole reluctance machine is illustrated. The stator 21 is provided with a 4-pole winding of conventional construction while the inner core 22 of magnetic material may be constructed and mounted in the manner illustrated in FIGURE 2 so as to be free to rotate or else be fixed as shown in FIG. 1. Rotor member 23 has its magnetic material arranged anisotropically in the form of four equal circumferential segments 24 of span substantially equal to $0.4\pi$ electrical radians. It will be seen that magnetically the combination of the circumferential segments 24 with the central core 22 of magnetic material provides a 4-pole salient pole type rotor having a direct-axis position of low magnetic reluctance and a quadrature-axis position of high magnetic reluctance relative to a 4-pole rotating magnetic field of the stator. However the torque developed is limited to rotor member 23.

Instead of providing the simple segments 24 illustrated in FIGURE 3, the segments 25 ilustrated in FIG. 4 may be used. These are provided with a central slot-like region 26 of non-magnetic material. This, while leaving the direct-axis reluctance virtually unchanged, considerably increases the quadrature-axis reluctance and so output torque.

Yet another construction for the magnetic parts of a rotor member is illustrated in FIGURE 5 in which like parts have the same reference numerals as FIGS. 3 and 4. Here, in addition to the segments 31 which correspond to the segments 24 in FIGURE 3 there are also provided additional segments 32 of span substantially equal to $0.5\pi$ electrical radians in the gaps between adjacent segments 31. These segments 32 are positioned round the periphery of rotor member 23 in FIGURE 5 so that they are separated from the stator of the machine by no more than the air gap 34 between stator and rotor. However, the gap of non-magnetic material 35 between segment 32 and the inner core 22 of magnetic material is arranged to be considerably larger than this and should be about the same depth as the depth of the segments 32.

FIGURE 6 illustrates modifications of the construction shown in FIG. 5 in which, in place of magnetic segments 31, magnetic segments 36 are provided having thin central slot-like regions 37 similar to the segments 25 illustrated in FIGURE 4, while in place of the segments 32 there are provided segments 38 having their inner corners 39 removed and having shallow channels 40 of span substantially equal to $0.3\pi$ electrical radians provided centrally in their outer surfaces. These modifications result in greatly increased output torques.

It will be understood that all the rotor constructions illustrated in FIGS. 3, 4, 5 and 6 may also be provided with a conventional electrical winding of the squirrel-cage type illustrated by the bars 3.

For the highest possible ratios of torque to inertia that the depth of the winding slots containing the bars 3 should be equal to, or as nearly equal to as mechanical considerations will allow, the depth of the magnetic material in which the bars are contained. Thus the winding slots should be as nearly as possible equal to the depth of the magnetic sections 24 in FIG. 3 and 25 in FIGURE 4. Windings would not normally be placed in the magnetic sections 32 in FIGURE 5.

I claim:

1. A dynamo-electric machine comprising a stator having an A.C. winding arranged to provide a magnetic field having at least a component thereof which rotates, a hollow cylindrical rotor member including an electrical winding and segments of magnetic material magnetically isolated from each other to provide direct-axis positions giving paths of low magnetic reluctance and quadrature-axis positions giving paths of high magnetic reluctance for said magnetic field, and a core of magnetic material positioned within the space defined by said rotor member and separated therefrom by an air-gap.

2. The machine as claimed in claim 1 in which said core is mounted so as to be free to rotate relative to the rotor member.

3. The machine as claimed in claim 1 in which the rotor member is supported at one end only and is open ended at its opposite end and the core is fixed relative to the stator and extends from the open end of the rotor member into the space defined within it.

4. The machine according to claim 1 in which each segment of the rotor is divided by a central slot extending the full depth of the segment.

5. The machine according to caim 1 in which the number of segments is equal to the number of poles of the stator magnetic field and there are also provided additional sections of magnetic material between the adjacent segments, which additional sections have a depth less than the thickness of the hollow rotor.

6. The machine according to claim 5 in which the additional sections have shallow central channels.

References Cited
UNITED STATES PATENTS

| | | | |
|---|---|---|---|
| 2,206,920 | 7/1940 | Riggs | 310—266 |
| 2,974,242 | 3/1961 | Apstein | 310—266 |

MILTON O. HIRSHFIELD, *Primary Examiner.*

L. L. SMITH, *Assistant Examiner.*